United States Patent [19]
Henriksen et al.

[11] Patent Number: 6,052,206
[45] Date of Patent: Apr. 18, 2000

[54] METHOD AND APPARATUS FOR DETECTING INCOMING FAXES

[75] Inventors: Richard Thomas Henriksen, Glendale Heights; T. Earl Poulson, Indian Head Park, both of Ill.

[73] Assignee: Lucent Technologies, Inc., Murray Hill, N.J.

[21] Appl. No.: 09/088,842

[22] Filed: Jun. 2, 1998

[51] Int. Cl.[7] .......................... H04N 1/00; G01N 21/86; G01V 9/04

[52] U.S. Cl. .......................... 358/434; 358/400; 399/16; 250/559.4

[58] Field of Search .................... 358/400, 488, 358/498, 296; 399/16, 405; 250/559.4, 223 R

[56] References Cited

U.S. PATENT DOCUMENTS 4,520,263  5/1985  Kitamura ........................ 250/559.4
5,813,667  9/1998  Imai et al. ........................ 270/58.14

FOREIGN PATENT DOCUMENTS 3-205247  9/1991  Japan ................. H04N 1/00
6-164805  6/1994  Japan ................. H04N 1/00
9-69908   3/1997  Japan ................. H04N 1/00

*Primary Examiner*—Kimberly A. Williams

[57] ABSTRACT

An apparatus and a method for remotely indicating that a fax has been received. Received faxes are detected using an infrared emitter that sprays infrared energy into space that is open when no paper is present in the paper tray that receives incoming faxes at a fax machine, but which space is occupied by paper when a fax has been received. When there is no paper present in the paper tray, the infrared energy is lost in space. When there is paper present in the paper tray, the infrared energy is reflected back to and sensed by a photo transistor. When the photo transistor senses the presence of paper in the paper tray, a high-brightness light emitting diode is flashed to indicate that a fax has been received.

14 Claims, 2 Drawing Sheets

METHOD AND APPARATUS FOR DETECTING INCOMING FAXES

BACKGROUND OF THE INVENTION

1. Field of the Invention

In general, the present invention relates to optical sensing, and more particularly to optically sensing the presence of a sheet of paper in a fax machine's paper tray into which incoming faxes are placed.

2. Statement of Related Art

In many business offices, individuals spend most of their time in a location from which they can not see whether an incoming facsimile transmission ("fax") has been received. In order to check whether any faxes have been received, such individuals must go to the fax machine's location and look to see whether a fax has been received. This leads to two undesirable results. First, a received fax can go unnoticed for an undesirably long period of time. This problem was recently portrayed in a popular movie in which the President of the United States' plane, Air Force One, is hijacked and the President faxes a desperate plea for help, which is successfully received, but no one notices that the fax has been received.

The second undesirable result of someone having a remotely located fax machine is that, when someone is expecting a fax that person may have to go to the fax machine several times to check whether the fax has been received.

It is therefore an object of this invention to provide an indication at a location remote from a fax machine that a fax has been received.

SUMMARY OF THE INVENTION

The present invention optically senses the presence of paper in the paper tray of a fax machine upon receipt of an incoming fax. An infrared emitter sprays infrared energy toward space that is open when no paper is in a fax machine's incoming fax paper tray, but which space is occupied by paper when paper is in the paper tray. When there is no paper in the tray, the infrared energy gets lost in space. Upon paper entering the tray, the paper reflects the infrared energy, and the presence of that reflected infrared energy is sensed by an infrared sensitive photo transistor. Upon sensing the reflected infrared energy, the preferred embodiment of this invention flashes a high-energy light emitting diode at a location remote from the fax machine, thereby indicating that a fax has been received.

These as well as other novel advantages, details, embodiments, features and objects of the present invention will be apparent to those skilled in the art from the following detailed description of the preferred embodiment of the invention, the attached claims, and the accompanying drawings.

DETAILED DESCRIPTION OF THE PREFERRED EMBODIMENT

Figure 1:
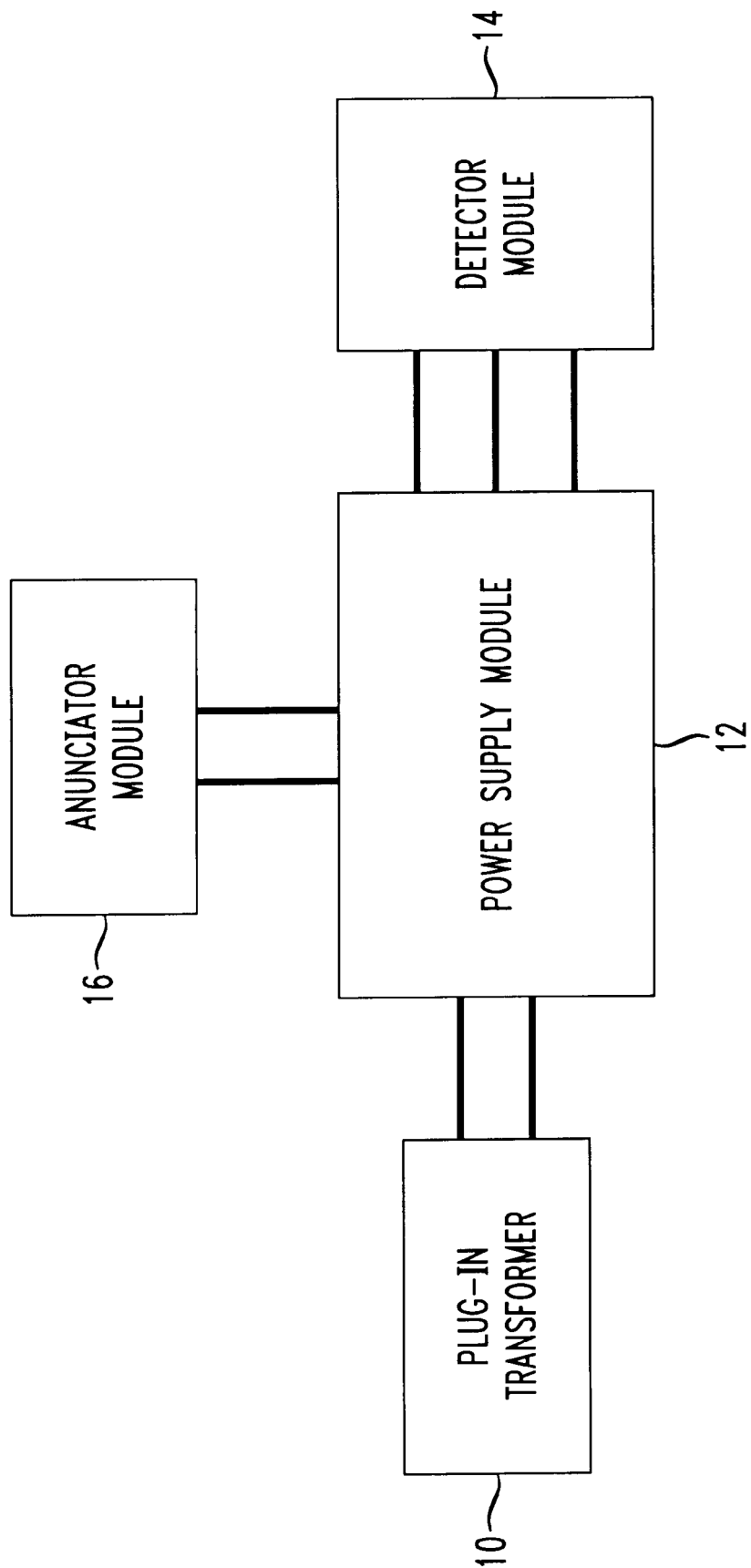
FIG. 1 is a simplified block diagram of the preferred embodiment of this invention.

FIG. 1 is a simplified block diagram of the preferred embodiment of this invention. FIG. 1 depicts plug-in transformer 10 coupled to power supply module 12, which is coupled to both: (1) detector module 14; and (2) annunciator module 16.

Figure 2:
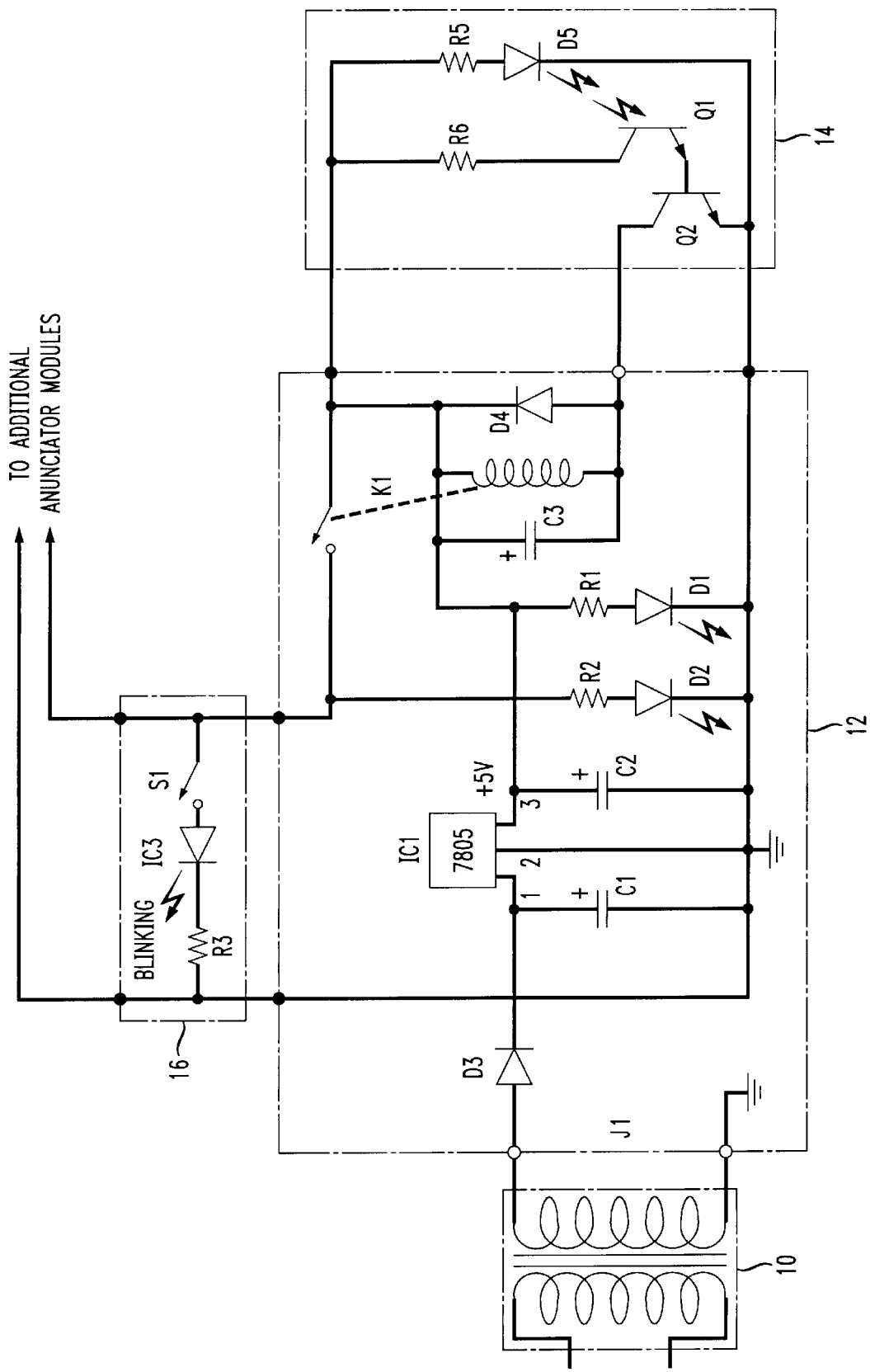
FIG. 2 is a detailed circuit diagram for the preferred embodiment of this invention.

FIG. 2 is a detailed circuit diagram of the preferred embodiment of this invention. FIG. 2 depicts, plug-in transformer 10, which is a typical, commercially available tnansformer. Transformer 10 steps down house power from 117 Volts of Alternating Current ("VAC") to between 8 and 13 VAC, which is rectified by half-wave rectifier D3. D3 may be a 1N4003 200 PIV 1A. Other suitable rectifiers could also be used. Direct current is fed to the input of IC1, which may be a 7805 regulator. Other suitable regulators could also be used. C1 acts as a pre-filter, and C2 filters the +5 V output of regulator IC1. C1 may be a 100 $\mu$FD /35 WVDC radial electrolytic capacitor, and C2 may be a 220 $\mu$FD / 16WVDC radial electrolytic capacitor. Other suitable capacitors could also be used. R1-D1 may be a green LED serving as a pilot light for the regulated output. R1 may be a 330 ohm ½ watt resistor. Other suitable resistors could also be used. Detector module 14 is fed +5 V to resistors R5 and R6. R5 may be a 47 ohm ½ watt resistor, and R6 may be a 2.2k ohm ½ watt resistor. Other suitable resistors could also be used. R5 sets the operating current for infrared-emitting diode D5, which is positioned to spray infrared energy on any paper present in the fax machine's tray that receives in-coming faxes. If paper is present in the paper tray, the infrared energy is reflected to and detected by infrared photo transistor Q1. A deep red, translucent piece of plastic protects infrared photo sensitive transistor Q1 by filtering ambient light. Other suitable means for filtering out ambient light could also be used. Resistor R6 limits the collector input of infrared photo transistor Q1. The emitter of infrared photo transistor Q1 is coupled to the base of transistor Q2. Q2 may be a 2N4401 NPN silicon transistor. Other suitable transistors may also be used. Transistor Q2 has the current handling capacity to pull in miniature relay K1. K1 may be a SPDT mini DIP relay. Other suitable relays could also be used. To reduce audible hum, miniature relay K1's coil is bypassed by capacitor C3. C3 may be a 100 $\mu$FD / 35WVDC radial electrolytic capacitor. Other suitable capacitors could also be used. Diode D4 acts as a damper to protect transistor Q2 from back EMF transients at turn off. D4 may be a 1N4003 200 PIV 1A. Other suitable diodes may also be used. One of relay K1's normally open contacts is coupled to the +5V source. The other of relay K1's normally open contacts is coupled to red LED R2-D2 and to flashing high-brightness red LED R3-IC3 in annunciator module 16. R2 may be a 330 ohm ½ watt resistor, and R3 may be a 47 ohm ½ watt resistor. As depicted in FIG. 2, additional annunciator modules may be easily coupled to annunciator module 16. Switch S1 in annunciator module 16 allows a person to turn off flashing LED R3-IC2 if it becomes annoying or when a person is not expecting an incoming fax.

It will be apparent to those having ordinary skill in the art that alternate means for indicating that the presence of a sheet of paper has been sensed in the paper tray could include: audible notification, placing a telephone call, sending an e-mail notification, and the like.

In the preferred embodiment, infrared emitter D5 and infrared-sensitive transistor Q1 are located on the same side of any paper to be sensed in a fax machine's paper tray. The preferred embodiment, therefore, is less obtrusive than having emitter D5 and infrared-sensitive transistor Q1 below and above (or above and below) any paper in the paper tray. Nevertheless, it will be apparent to those having ordinary skill in the art that having emitter D5 and infrared-sensitive transistor Q1 either above and below or below and above the paper is within the scope of this invention.

We claim:

1. An apparatus for detecting the presence of an incoming fax at a fax machine, said fax machine having a paper tray for receiving incoming faxes, said apparatus comprising:
   a. an optical sensor for detecting the presence of a sheet of paper in said paper tray of said fax machine;
   b. an annunciator coupled to and responsive to said optical sensor for indicating whether said optical sensor has detected the presence of a sheet of paper in said paper tray of said fax machine; and
   c. a filter that promotes a decrease of ambient light received by said optical sensor.

2. The apparatus of claim 1 wherein: said annunciator comprises a light emitting diode.

3. The apparatus of claim 1 wherein said optical sensor comprises:
   a. an infrared emitter located such that said infrared emitter can spray infrared energy onto a sheet of paper in said paper tray; and
   b. an infrared photo transistor located such that said infrared photo transistor can sense said emitted infrared energy reflected by said sheet of paper.

4. The apparatus of claim 1 wherein said filter protects said optical sensor by decreasing ambient light received by said optical sensor.

5. The apparatus of claim 1 wherein said filter comprises: a translucent cover.

6. A method for detecting the presence of an incoming fax, at a fax machine, said fax machine having a paper tray for receiving incoming faxes, said method comprising the steps of:
   a. optically sensing the presence of a sheet of paper in said paper tray of said fax machine;
   b. indicating whether the presence of a sheet of paper in said paper tray has been optically sensed; and
   c. employing a filter to promote a decrease of ambient light received during said optical sensing.

7. The method of claim 6 further comprising the step of: using a light emitting diode to indicate whether the presence of a sheet of paper in said paper tray has been optically sensed.

8. The method of claim 6 wherein said optical sensing comprises the steps of:
   a. emitting infrared energy toward a location at which a sheet of paper will be located when an incoming fax has been received; and
   b. sensing said emitted infrared energy being reflected by a sheet of paper in said paper tray using an infrared photo transistor.

9. The method of claim 6 wherein said employing said filter comprises the step of: filtering ambient light received during said optical sensing.

10. The method of claim 6 wherein said employing said filter comprises the sep of: using translucent material for filtering ambient light received during said optical sensing.

11. An apparatus for detecting the presence of an incoming fax, at a fax machine, said fax machine having a paper tray for receiving incoming faxes, said apparatus comprising:
    a. means for optically sensing the presence of a sheet of paper in said paper tray of said fax machine;
    b. means for indicating whether the presence of a sheet of paper in said paper tray has been optically sensed; and
    c. means for promoting a decrease of ambient light received by said optical sensing means.

12. The apparatus of claim 11 wherein said optical sensing means comprises:
    a. means for emitting infrared energy toward a location at which a sheet of paper will be located when an incoming fax has been received; and
    b. means for sensing said emitted infrared energy being reflected by a sheet of paper in said paper tray using an infrared photo tranistor.

13. The apparatus of claim 11 wherein said means for promoting the decrease of ambient light comprises: means for filtering ambient light received by said optical sensing means.

14. The apparatus of claim 13 wherein said means for filtering ambient light comprises: translucent material.

* * * * *